US011025738B2

(12) United States Patent
Patel

(10) Patent No.: US 11,025,738 B2
(45) Date of Patent: *Jun. 1, 2021

(54) SYSTEMS AND METHODS FOR DETERMINING A DESTINATION LOCATION FOR TRANSMISSION OF PACKETIZED DATA IN A NETWORK SYSTEM BASED ON AN APPLICATION SERVER ATTRIBUTE

(71) Applicant: Evertz Microsystems Ltd., Burlington (CA)

(72) Inventor: Rakesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 16 days.

This patent is subject to a terminal disclaimer.

(21) Appl. No.: 16/505,825

(22) Filed: Jul. 9, 2019

(65) Prior Publication Data
US 2019/0335012 A1    Oct. 31, 2019

Related U.S. Application Data

(63) Continuation of application No. 15/172,227, filed on Jun. 3, 2016, now Pat. No. 10,397,356.

(60) Provisional application No. 62/170,284, filed on Jun. 3, 2015.

(51) Int. Cl.
*H04L 29/08* (2006.01)

(52) U.S. Cl.
CPC ...... *H04L 67/2838* (2013.01); *H04L 67/1006* (2013.01); *H04L 67/1014* (2013.01)

(58) Field of Classification Search
CPC ... G06F 13/00; G06F 15/173; H04L 12/5693; H04L 29/06; H04L 29/08; H04L 29/0809; H04L 29/06537; H04L 29/08072; H04L 29/08576; H04L 29/12009; H04L 29/12066; H04L 41/12; H04L 41/22; H04L 41/0213; H04L 45/00; H04L 45/02; H04L 45/302; H04L 45/306; H04L 45/3065; H04L 47/10; H04L 61/106; H04L 61/1511; H04L 67/00; H04L 67/10; H04L 67/42; H04L 67/322; H04L 67/327; H04L 67/1006; H04L 67/1014; H04L 67/2838
USPC ................................ 709/223, 228, 240, 245
See application file for complete search history.

(56) References Cited

U.S. PATENT DOCUMENTS

| | | |
|---|---|---|
| 6,513,128 B1 | 1/2003 | Wang et al. |
| 7,397,794 B1 | 7/2008 | Lacroute et al. |
| 8,594,079 B2 | 11/2013 | Kwon et al. |
| 10,397,356 B2 | 8/2019 | Patel |
| 2009/0319685 A1 | 12/2009 | Martin |
| 2010/0100629 A1 | 4/2010 | Raciborski et al. |
| 2013/0089089 A1 | 4/2013 | Kamath et al. |
| 2013/0329725 A1 | 12/2013 | Nakil et al. |

(Continued)

*Primary Examiner* — Robert B Harrell
(74) *Attorney, Agent, or Firm* — Bereskin & Parr LLP/S.E.N.C.R.L., s.r.l.

(57) ABSTRACT

Various embodiments are described herein for systems and methods that can be used to determine a destination location in a network fabric. In one example embodiment, the method comprises receiving an application server attribute at a fabric controller from a source port, generating at the fabric controller a destination location based on the application server attribute and mapping information stored on the fabric controller, and transmitting the destination location to the source port, where the source port transmits packetized data to a destination location based on the destination location.

20 Claims, 13 Drawing Sheets

(56) References Cited

U.S. PATENT DOCUMENTS

2013/0336134 A1 12/2013 Bao et al.
2014/0056141 A1 2/2014 Breternitz, Jr. et al.

SYSTEMS AND METHODS FOR DETERMINING A DESTINATION LOCATION FOR TRANSMISSION OF PACKETIZED DATA IN A NETWORK SYSTEM BASED ON AN APPLICATION SERVER ATTRIBUTE

CROSS-REFERENCE TO RELATED APPLICATION

This application is a Continuation of U.S. patent application Ser. No. 15/172,227 filed Jun. 3, 2016 (now issued U.S. Pat. No. 10,397,356 B2), and claims the benefit of U.S. Provisional patent application Ser. No. 62/170,284 filed Jun. 3, 2015. The entire contents of U.S. application Ser. No. 15/172,227 and U.S. Provisional patent application Ser. No. 62/170,284 are incorporated by reference herein.

FIELD

The described embodiments relate generally to systems and methods for a network system, and in particular to systems and methods for determining a destination location in a network system.

BACKGROUND

Network systems are used in a variety of applications and are increasing in size and complexity. Network systems are typically used for hosting and distributing content. For example, network systems are used in data centers for hosting and distributing Internet content, in enterprises for hosting and distributing application content used within an organization, and in broadcasting for hosting and distributing audio and video content.

Known network systems interconnect a plurality of application servers that host and distribute various types of content through a network fabric. Application servers distribute content through the network fabric to other application servers associated with that content. For example, an e-commerce website may contain one application server for processing transactions through the website and another application server for hosting the website content, such as the homepage. The application server for processing transactions may distribute content to the application server hosting the homepage in order to present transaction information to the end user interacting with the website.

Application servers connected to a network fabric may comprise a plurality of virtual application servers for greater resource efficiency; however, this approach often increases the number of management points within a network system. For example, a separate network management point may be required to manage only virtual application servers. Physical application servers and virtual application servers may be provided by different vendors, which may add further complexity in managing a network system.

Application servers deployed in known network systems may generally know where their hosted content should be distributed. For example, an application server that hosts closed captioning content for a particular video segment may know the destination of its content to be the application server that aggregates audio, video and closed captioning content for that particular video segment. However, in these or other known network systems, the location of the destination might not be known, and an external controller may be queried to determine the destination location each time one application server attempts to transmit content to another application server.

SUMMARY

In a first aspect, some embodiments of the invention provide a method for determining a destination port in a network fabric based on an application server attribute and mapping information, the method comprising: receiving an application server attribute at a fabric controller from a source port, generating at the fabric controller a destination identifier based on the application server attribute and mapping information stored on the fabric controller, and transmitting the destination identifier to the source port, where the source port updates mapping information stored on the source port based on the destination identifier, and where the source port transmits packets to a destination port.

In some cases, the application server attribute comprises a local identification number assigned to an application server by the fabric controller.

In other cases, the application server attribute comprises content metadata.

In some cases, the application server attribute comprises a source address.

In some embodiments, if the fabric controller is unable to determine the destination port based on the application server attribute and mapping information, the method further comprises the fabric controller transmitting a request to a network supervisor, receiving a response from the network supervisor comprising the destination port, updating mapping information stored on the fabric controller based on the response, generating a destination identifier based on mapping information, and transmitting a destination identifier to the source port.

In another aspect, the mapping information stored on the fabric controller contains at least one port record, wherein each port record comprises two fields that correlate an application server attribute with a destination port.

In some embodiments, the destination identifier directs a source port to instantiate a destination application server and to transmit packets from the source port to the instantiated destination application server.

In some cases, the source port configures fabric card buffers on a corresponding fabric card based on mapping information stored on the source port.

In some embodiments, the destination identifier is an IP address.

In another broad aspect, some embodiments provide a fabric controller for determining a destination port in a network fabric, the fabric controller comprising a memory for storing mapping information, a processor for receiving an application server attribute from a source port, generating a destination identifier based on the application server attribute and mapping information, and transmitting the destination identifier to the source port.

In another broad aspect, some embodiments provide a system that comprises at least two fabric controllers coupled together over a communication network.

In other embodiments, the at least two fabric controllers are coupled to a network supervisor.

In another broad aspect, some embodiments provide a first fabric controller that transmits a request to a second fabric controller to determine a destination port.

In other embodiments, a second fabric controller transmits a request to a network supervisor, wherein the network supervisor transmits a response to a first fabric controller.

BRIEF DESCRIPTION OF THE DRAWINGS

Several embodiments of the present invention will now be described in detail with reference to the drawings, in which.

Figure 1:
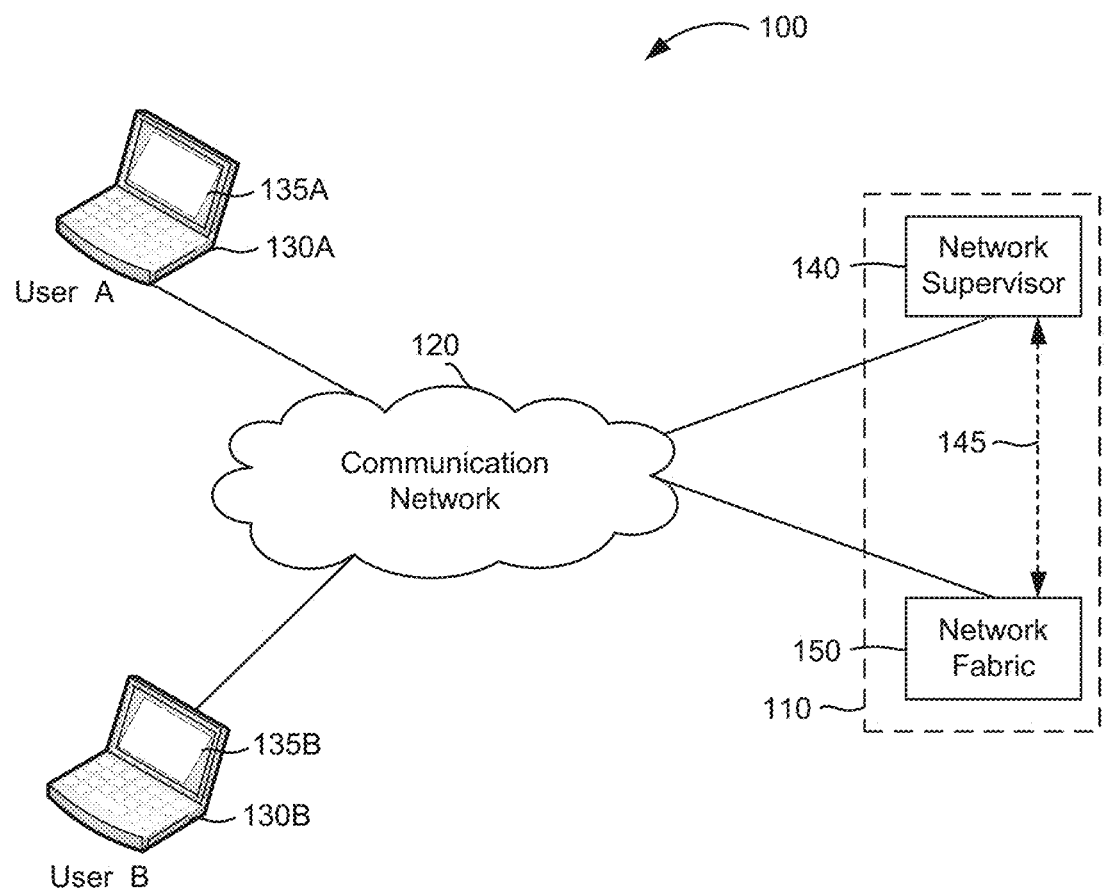
FIG. 1 illustrates a system for providing end users with content from different content providers according to an example embodiment.

The drawings are provided for the purposes of illustrating various aspects and features of the example embodiments described herein. For simplicity and clarity of illustration, elements shown in the figures have not necessarily been drawn to scale. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, mobile telephone, smartphone or any other computing device capable of being configured to carry out the methods described herein.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a non-transitory computer readable storage medium (e.g. read-only memory, magnetic disk, optical disc). The storage medium so configured causes a computer to operate in a specific and predefined manner to perform the functions described herein.

While particular combinations of various functions and features are expressly described herein, other combinations of these features and functions are possible that are not limited by the particular examples disclosed herein, and these are expressly incorporated within the scope of the present invention.

The various embodiments described herein generally relate to systems and methods for determining a destination location in a network fabric. A network fabric is typically used for interconnecting various network devices (e.g., application servers, switches, routers, hubs, etc.) to facilitate multipoint-to-multipoint connections. The application server transmitting or sending content is referred to herein as the source application server, and the application server receiving the content is referred to herein as the destination application server. The source and the destination may also be expressed with reference to ports associated with source and destination application servers. Content transmitted between source and destination application servers may be transmitted as packetized data.

In various embodiments discussed herein, network fabric comprises a fabric controller situated within the network fabric. The fabric controller facilitates the transmission of data between various network devices based on one or more factors, known herein as application server attributes. The fabric controller may be configured to store mapping information that correlates a source application server with a destination location or identifier based on the one or more application server attributes. In some other cases, the fabric controller is coupled to a network supervisor external to the network fabric. In cases where the fabric controller is unable to identify a destination location based on mapping information and an application server attribute transmitted by the port controller coupled to the source ("source port"), the fabric controller queries the network supervisor in order to determine destination server or port location.

In various cases, the fabric controller located within the network fabric is configured to determine the location of a destination application server or a port based on one or more application server attributes. The destination location may be the Internet protocol (IP) address of the destination server or port. The destination location may alternatively be some locally assigned and/or network fabric specific identifier associated with the destination server or port. The local identifier may be assigned by the fabric controller or network supervisor. Any other unique way of identifying the destination server and/or port may be used, and in those cases, the fabric controller is configured to determine the unique location of the destination server/port based on the one or more application server attributes.

One or more application server attributes used by the network fabric to uniquely identify the destination location may comprise metadata corresponding to the packetized content to be transferred from source to destination application server. The application server attribute may alternatively or additionally comprise the source server/port related information, such as, for example, IP address of the source application server, IP address of the source port, locally assigned source server identifier, locally assigned port identifier etc. Locally assigned source and port identifiers may comprise locally assigned names or numbers corresponding to the source server or source port. The local identifiers may be assigned by the fabric controller or the network supervisor. The application server attribute may also comprise a third party signal indicating the destination location where the packetized signal is to be transmitted. Other types of application server attributes allowing the fabric controller to determine the destination location may also be used.

In some cases, fabric controllers within different network systems may rely on each other to identify the destination location. For example, in some cases, a first fabric controller resides within a first network fabric and is coupled to a second fabric controller residing within a second network fabric. The first fabric controller may query the second fabric controller to determine the location of the destination based on the mapping information stored within the second fabric controller and application server attributes transmitted to the first fabric controller.

Implementing a fabric controller within a network system, as described in the following embodiments, may have several advantages. Network efficiency may be improved by maintaining source and destination mapping information within the network fabric, and therefore within the network system. By reducing queries to an external network supervisor in order to distribute content between application servers, network congestion may also be minimized. Furthermore, by making the network fabric responsible for determining destination location, processing complexities of application servers or other network components may be reduced significantly, allowing simple or "dumb" network components to be connected to the network system. This may also enable network components manufactured or maintained by different vendors to interact and exchange content without any challenges.

Reference is first made to FIG. 1, which illustrates system 100 for providing content to client systems 130A and 130B from network system 110 over a communications network 120, according to an example embodiment. In this embodiment, client system 130A represents a first end user ("User A") receiving content from a first content provider 135A and client system 130B represents a second end user ("User B") receiving content from a second content provider 135B.

Client systems 130A and 130B may be any networked computing device, including a processor and memory, capable of communicating with a network. A computing device may be a personal computer, workstation, server, portable computer, mobile phone, laptop wirelessly coupled to an access point (e.g. a wireless router, a cellular communications tower, etc.), a wirelessly enabled personal data assistant (PDA) or smart phone, a terminal, a tablet computer, a game console over a wired or wireless connection, WAP phone, or a combination of these.

Content providers 135A and 135B may include, Internet websites, such as, for example, e-commerce websites (for example, Amazon.com™ or eBay.com™) streaming media services (for example, Netflix™, YouTube™ or Hulu™), or mapping services (for example, Google Maps™)

In one example, client system 130A may be viewing a movie using Netflix™ online streaming service, which employs various application servers to provide content to end users. Examples of various application servers employed by Netflix™ may include audio server for storing audio content, video server for storing video content, and closed captioning server for storing closed captioning content.

Client system 130B may be purchasing products through eBay.com™, which employs various application servers to facilitate the transaction. Examples of application servers employed by eBay™ may include an advertising server for displaying advertisements, a products server for displaying products that a user may be interested in purchasing, and an accounts server for recording account information (for example, banking information, personal details, etc.) of its users.

System 100 includes a communication network 120 for connecting client systems 130A and 130B to network system 110. Communication network 120 may be any network or network components capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.), and others, including any combination of these.

Network system 110 comprises network supervisor 140 and network fabric 150 that facilitates multipoint-to-multipoint connectivity to a plurality of network components (not shown). Network fabric 150 may be any network architecture that facilitates multipoint-to-multipoint connectivity, for example, providing multiple active paths between network components, such as application servers, coupled to the network fabric. Network fabric 150 may be implemented with any transmission medium capable of carrying data, including Ethernet, optical fiber, coaxial, wireless, electronic components on printed circuit boards, or any other suitable transmission medium.

Network supervisor 140 is a centralized network controller maintaining information regarding the location of each of the network end points or network components (e.g. application servers, port controllers, etc.) connected to one or more network fabrics. Network supervisor 140 may provide network orchestration by defining and implementing network policies and network service levels through, for example, automated workflows and network provisioning. Network supervisor 140 may be any networked computing device, including a processor and memory, capable of communicating with a network. A computing device may include a personal computer, workstation, server, portable computer, laptop, or any other suitable computing device.

In some cases, where the network supervisor 140 and network fabric 150 are located within close proximity to each other, the network supervisor 140 and network fabric 150 may be coupled through a communication link 145. Communication link 145 may comprise any link suitable for data transmission, including, for example, coaxial, twisted pair, or fiber optic cables. In some other cases, such as where the network supervisor 140 and network fabric 150 are located remotely from each other, the network supervisor 140 and network fabric 150 may be coupled through communication network 120.

Figure 2A:
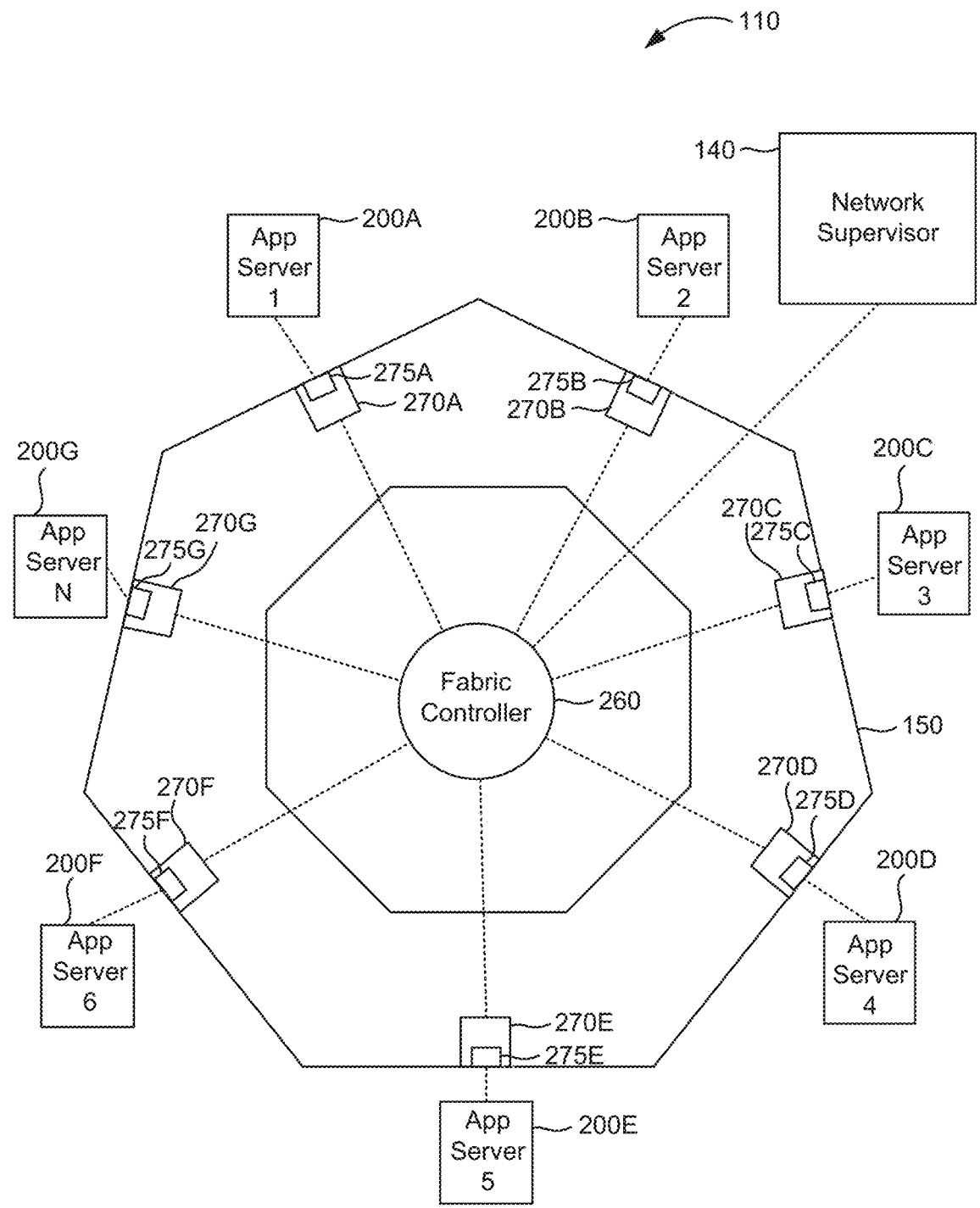
FIG. 2A illustrates a network system for distributing content within a network fabric according to an example embodiment.

Reference is next made to FIG. 2A, which illustrates an example embodiment of network system 110. Network system 110 includes network fabric 150, network supervisor 140 and a plurality of application servers 200A-200G. Network supervisor 140 is located externally to the network fabric 150.

Each of the application server 200A-200G may include computing processing abilities and memory such as database(s) or file system(s). Application servers 200A-

200G may process HTTP requests or requests through various other protocols. One or more application servers 200A-200G may comprise media servers for providing access to multimedia content, such as video and audio content. Same multimedia content may be saved in different formats or resolutions in the media servers.

Network fabric 150 further includes a fabric controller 260 and a plurality of fabric cards 270A-270G. Fabric card 270A corresponds to a first fabric card, fabric card 270B corresponds to a second fabric card, fabric card 270C corresponds to a third fabric card, fabric card 270D corresponds to a fourth fabric card, fabric card 270E corresponds to a fifth fabric card, fabric card 270F corresponds to a sixth fabric card, and fabric card 270G corresponds to an $n^{th}$ fabric card.

As previously mentioned, fabric cards 270A-270G form part of the network fabric 150. Fabric cards 270A-270G provide an interface between application servers 200A-200G and network fabric 150. Specifically, each of the fabric cards 270A-270G provide a corresponding port to receive an application server and couple it to the network fabric 150. Fabric cards 270A-270G may be implemented on one or more printed circuit boards (PCBs) housed in rack-mounted equipment.

Each fabric card 270A-270G contains a plurality of fabric card buffers and a corresponding port controller 275A-275G. As illustrated, fabric card 270A contains port controller 275A, fabric card 270B contains port controller 275B, fabric card 270C contains port controller 275C, fabric card 270D contains port controller 275D, fabric card 270E contains port controller 275E, fabric card 270F contains port controller 275F and fabric card 275G contains port controller 275G.

Fabric card buffers can be configured to store and queue data packets transmitted between source and destination ports. Port controllers 275A-275G can be configured to generate application server attributes used by the fabric controller to determine the destination location. Port controllers 275A-275G may generate application server attributes in a variety of ways, such as, for example, from the packetized data as received for transmission, from source server specific information, from third party signals etc.

In some cases, port controller 275A-275G are implemented on a printed circuit board as an integrated circuit, and in other cases port controllers 275A-275G are a virtualized instance of a physical processor within the network fabric 150. In some cases, port controllers 275A-275G may reside in a standalone rack unit. In some other cases, port controllers 275A-275G may reside in a rack unit with other network fabric equipment, for example, with fabric controller 260.

Each port controller 275A-275G may also be coupled to more than one application server. For example, a port controller may be coupled to a physical application server and a virtual application server via the physical application server. A virtual application server generally refers to a software implementation of a physical computing environment (for example, a server) that is partitioned from, and operates independently of the physical computing environment, while utilizing the physical components (e.g., processor, memory, etc.) of the physical computing environment.

Figure 6:
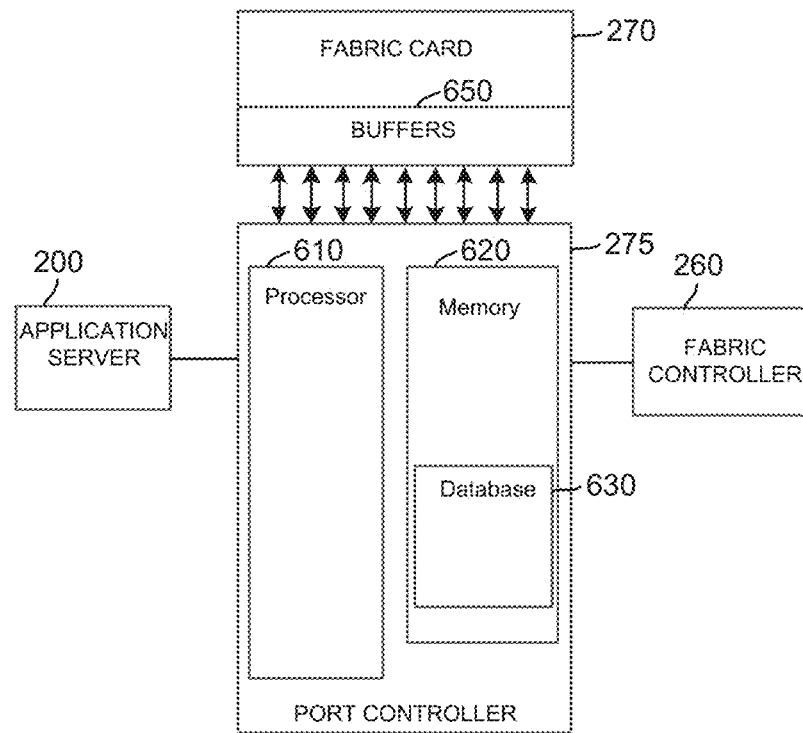
FIG. 6 illustrates a port controller according to an example embodiment.

As illustrated in FIG. 6, each port controller 275A-275G includes a processor 610, memory 620, and a database 630. Processor 610 is operable to configure fabric card buffers 650. Fabric card buffers 650 are configured based on an indication from the fabric controller 260. Memory 620 is operable to store data, and database 630 is operable to store records. Records stored in database 630 correspond to application server attributes generated by the port controller and the destination location corresponding to the generated attribute. A record may be entered, or an existing record may be updated in database 630, every time packetized data is transmitted to a destination server/port.

Fabric controller 260 is located within the network fabric 150 and coupled to network fabric cards 270A-270G forming the edges of the network fabric 150. Fabric controller 260 generates destination location based on one or more application server attributes received from the port controllers 275A-275G. Fabric controller 260 may generate destination location based on mapping information stored within the fabric controller 260. In some cases, mapping information is received from the network supervisor 140.

Figure 5:
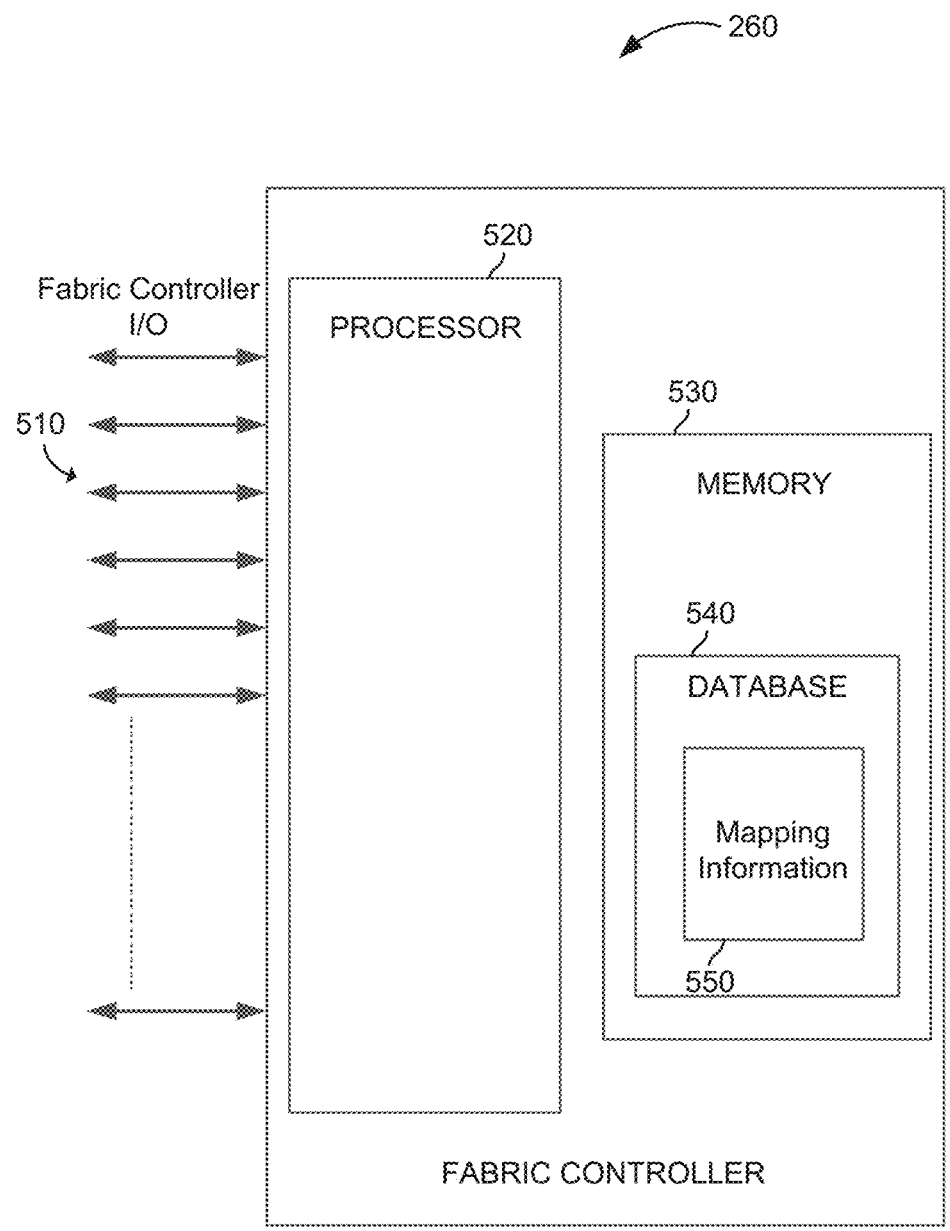
FIG. 5 illustrates a fabric controller according to an example embodiment.

Reference is now made to FIG. 5, illustrating an example embodiment of fabric controller 260. Fabric controller 260 comprises a plurality of input and output ports 510 for transmitting and receiving application server attributes from a plurality of sources. Fabric controller 260 is configured to, directly or indirectly, transmit and receive signals to/from port controllers 275A-275G, fabric controllers in other network systems, and network supervisor 140. Fabric controller 260 also comprises a processor 520 for performing logical processing and manipulation of data, memory 530 for storing data, and a database 540 for storing mapping information 550.

Mapping information 550 contains a plurality of port records. Each port record comprises at least two fields correlating the source and the destination. In some cases, a port record includes one field corresponding to an application server attribute and a second field corresponding to destination port IP address. In some other cases, the second field may be the destination server IP address. In some further cases, the second field may be a locally assigned identifier for the destination port and/or server.

Each port record may comprise additional fields, such as, for example, a port record may include three fields, where two fields correspond to application server attributes and third field corresponds to destination location. For example, the two fields corresponding to the application server attributes may include content metadata and source IP address, and the one field corresponding to the destination location may include destination server IP address. Alternatively, the two fields may correspond to destination port IP address and destination server IP address, and the one field may correspond to source IP address.

Fabric controller 260 may be implemented on a printed circuit board as an integrated circuit. Fabric controller 260 may alternatively be implemented as a virtualized instance of a physical processor within network fabric 150. Fabric controller 260 may reside in a standalone rack unit, or may reside in a rack unit with other network fabric equipment. For example, fabric controller 260 may reside with fabric cards 270A-270G.

Figure 2B:
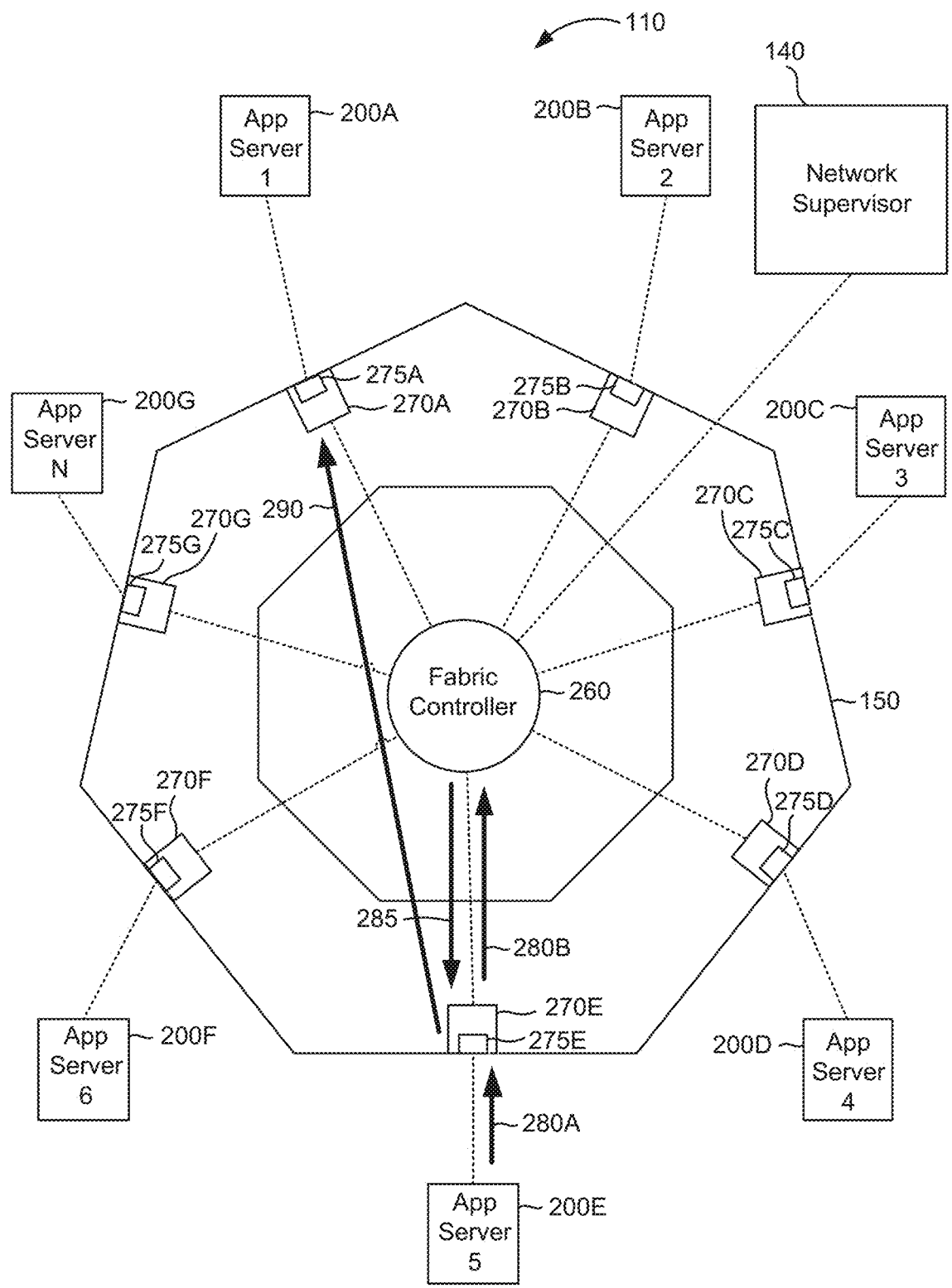
FIG. 2B illustrates a data flow for a network system according to an example embodiment.

Reference is now made to FIG. 2B, which illustrates an example data flow between two application servers in a network system 110. In this example embodiment, application server 200E is the source application server coupled to port controller 275E.

In various embodiments discussed herein, data flow begins when source application server 200E, unaware of the location of the destination application server, intends to transmit packetized data 280A to the destination application server via the network fabric 150. In order to route the packets to the destination application server, source application server 200E transmits packetized data 280A to the network fabric 150. Port controller 275E coupled to source application server 200E receives the packetized data 280A and configures fabric card buffers, such as fabric card buffers 650 as discussed in detail below, on the corresponding fabric card 270E to store the packetized data 280A. Port controller 275E determines one or more application server attributes 280B from the packetized data 280A.

Port controller 275E may process the packetized data 280A to determine an application server attribute 280B. For example, port controller 275E may process the packetized data 280A to generate metadata. Port controller 275E may also process the packetized data 280A to extract the source address from the packetized data 280A, and/or extract a local identifier assigned to the source server by the fabric controller 260 or network supervisor 140. Port controller 275E may alternatively receive a signal, for example, from a third party, based on which the application server attribute may be generated.

Once generated, the port controller 275E transmits the application server attribute 280B to the fabric controller 260. Fabric controller 260 receives the application server attribute 280B and determines a destination port based on mapping information 550 stored in the memory. If the fabric controller 260 can determine a destination port based on the application server attribute 280B and mapping information 550, the fabric controller 260 generates a destination identifier 285 and transmits the destination identifier to the source port 275E.

Upon receiving the destination identifier 285, the source port 275E configures fabric card buffers 650 to transmit packets 290 to the destination port based on the destination identifier 285. In this example, port controller 275E transmits packets 290 to the destination port 275A. Packets 290 correspond substantially to packetized data 280A, however, may include additional data appended by port controller. Additional data may include, for example, the destination identifier 285.

In some embodiments, port controller 275E may store the destination identifier 285 corresponding to an application server attribute 280B in database 630 as a record. In such cases, if the port controller 275E receives subsequent packetized data 280A from the source application server 200E, port controller 275E may check database 630 to determine if a destination identifier 285 was previously recorded. If the port controller 275E is able to determine the destination port based on the destination identifier 285 recorded in database 630, then port controller 275E configures fabric card buffers 650 in the corresponding fabric card 270E to transmit packets 290 to the destination port 275A based on the previously recorded destination identifier 285. Upon receiving packets 290 at the destination port 275A, the destination port 275A relays the packets 290 to destination application server 200A.

Figure 2C:
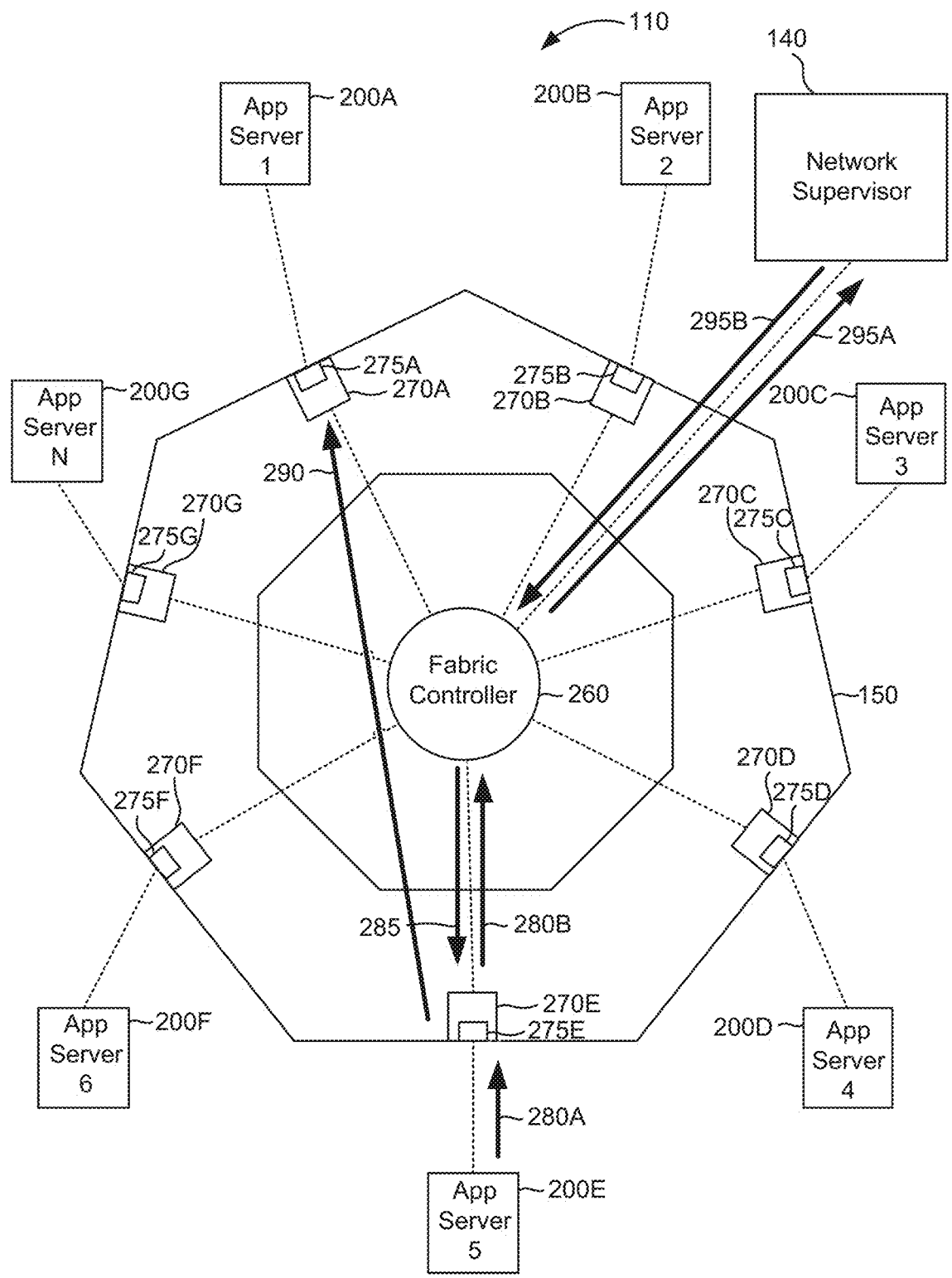
FIG. 2C illustrates a data flow for a network system according to another example embodiment.

Referring now FIG. 2C, which illustrates another example data flow of network system 110. In this embodiment, source application server 200E transmits packetized data 280A to network fabric 150. Source port 275E receives the packetized data 280A and configures fabric card buffers 650 on the corresponding fabric card 270E to store the packetized data 280A. Source port 275E determines an application server attribute 280B from the packetized data 280A. The source port 275E then transmits the application server attribute 280B to the fabric controller 260.

Upon receiving the application server attribute 280B, fabric controller 260 determines a destination port based on mapping information 550 and application server attribute 280B. In cases where the fabric controller 260 is unable to determine a destination port based on the application server attribute 280B and mapping information 550, fabric controller 260 transmits a request 295A to network supervisor 140 to obtain a destination identifier 285. Request 295A may comprise application server attribute 280B and may identify the source port from which the application server attribute 280B originated.

Based on the request 295A from the fabric controller 260, network supervisor 140 determines a destination location or identifier and transmits a response 295B to the fabric controller 260. Upon receiving the response 295B from the network supervisor 140, fabric controller 260 updates mapping information 550 based on the response 295B. Fabric controller 260 then relays the destination location or identifier 285 based on the application server attribute 280B and mapping information 550. Fabric controller 260 then transmits a destination identifier 285 to the source port 275E. Port controller 275E receives the destination identifier 285 from fabric controller 260 and relays the packets 290 to destination port 275A.

Figure 3:
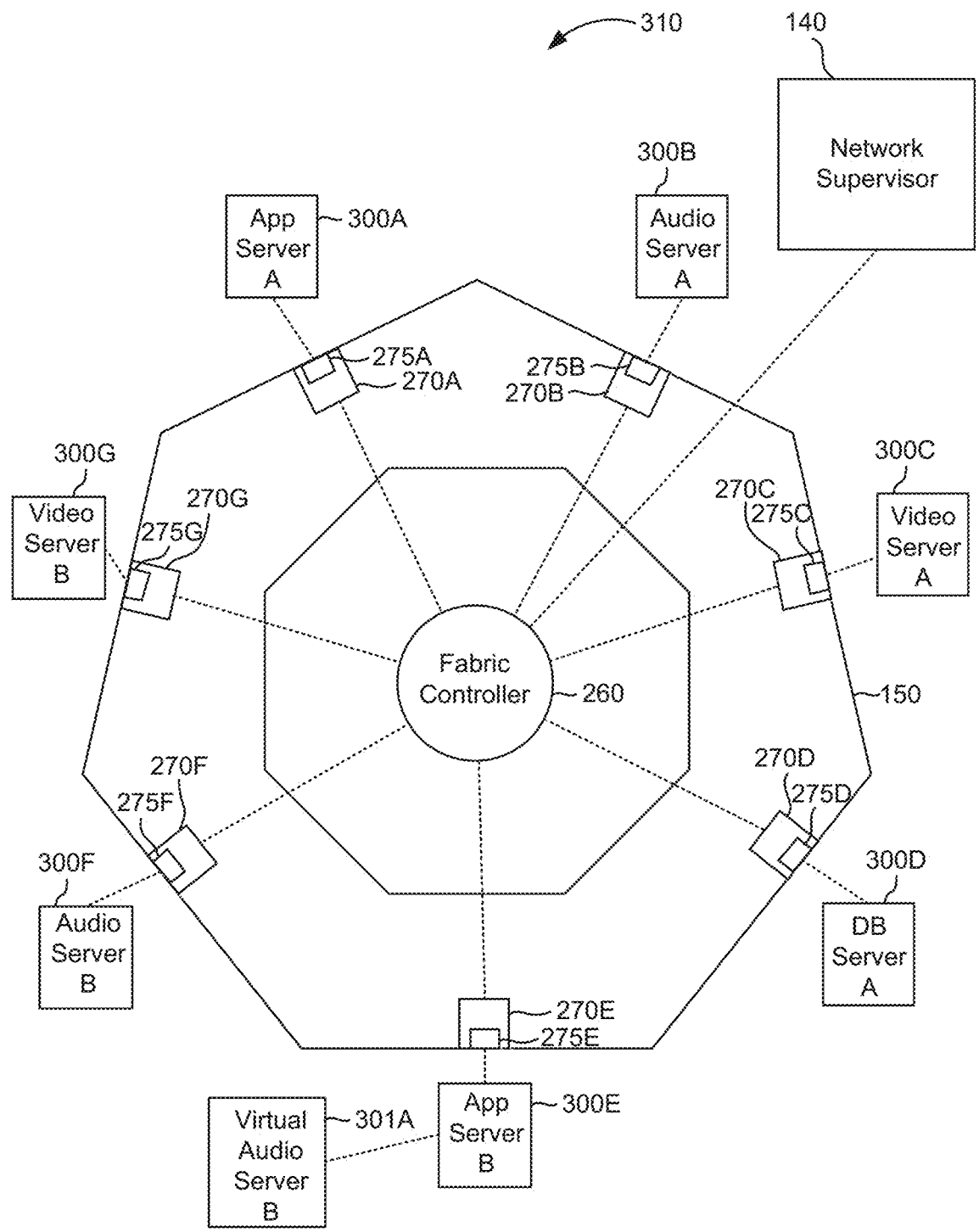
FIG. 3 illustrates network system according to another example embodiment.

Referring now to FIG. 3, which illustrates another example embodiment of network system 310. Network system 310 comprises a network supervisor 140, network fabric 150, and a plurality of application servers 300A-300G and 301A. Network fabric 150 comprises fabric controller 260 and a plurality of fabric cards, 270A-270G.

In this embodiment, application server 301A is illustrated to be a virtual audio server B, and application servers 300A-300G are illustrated to be physical servers. In this embodiment, application server A 300A, audio server A 300B, video server A 300C, and database server A 300D are all associated with a single content provider, such as, for example Netflix™. Application server A 300A aggregates and distributes content received from audio server A 300B, video server A 300C, and database server A 300D. Similarly, application server B 300E, audio server B 300F and video server B 300G are all associated with another content provider, such as, for example, YouTube™. Application server B 300E aggregates and distributes content received from audio server B 300F and video server B 300G.

Audio server A 300B may store the audio content associated with an end user purchase. Video server A 300C may store the video content associated with the end user purchase. Database server A 300D may perform the transactional tasks associated with the end user purchase. Each of the application servers 300B-300D will need to transmit content to application server A 300A, so that the content can be aggregated and distributed to the end user. However, typically application servers 300B-300D do not know the location of application server 300A within network fabric 150.

Each application server 300B-300D transmits packetized data 280A to the network fabric 150. The packetized data 280A from each application server 300B-300D is received by the respective port controller 275B-275D. Each port controller 275B-275D then configures fabric card buffers 650 on the corresponding fabric card 270B-270D to store packetized data 280A. Port controllers 275B-275D determine an application server attribute 280B from the packetized data 280A. The source port 275B-275D then transmits the corresponding application server attribute 280B to the fabric controller 260. This process may occur simultaneously or sequentially for each application server 300B-300D.

Fabric controller 260 checks mapping information 550 to correlate the application server attribute 280B with a destination port. If the destination port is correlated by fabric controller 260 based on the application server attribute 280B and mapping information 550, fabric controller 260 generates a destination identifier 285 and transmits the destination identifier 285 back to the corresponding port controllers 275B-275D. Upon receiving the destination identifier 285, the source ports configure fabric card buffers 650 on respective fabric cards 270B-270D to transmit packets 290 from the source port to the destination port.

If the fabric controller 260 is unable to correlate the application server attribute 280B with a destination port based on mapping information 550, the fabric controller 260 transmits a request 295A to the network supervisor 140 to obtain the destination port based on the application server attribute 280B, as illustrated in FIG. 2C. Fabric controller 260 then receives a response 295B from network supervisor 140 that correlates the application server attribute 280B with a destination port. Fabric controller 260 then updates mapping information 550 based on the response 295B. Fabric controller 260 relays the destination identifier 285 to the corresponding port controller 275B-275D, which configures fabric card buffers 650 on respective fabric cards 270B-270D to transmit packets 290 to the destination port 275A based on the destination identifier 285. Analogous procedure takes place for application servers B 300E-300G.

Figure 4A:
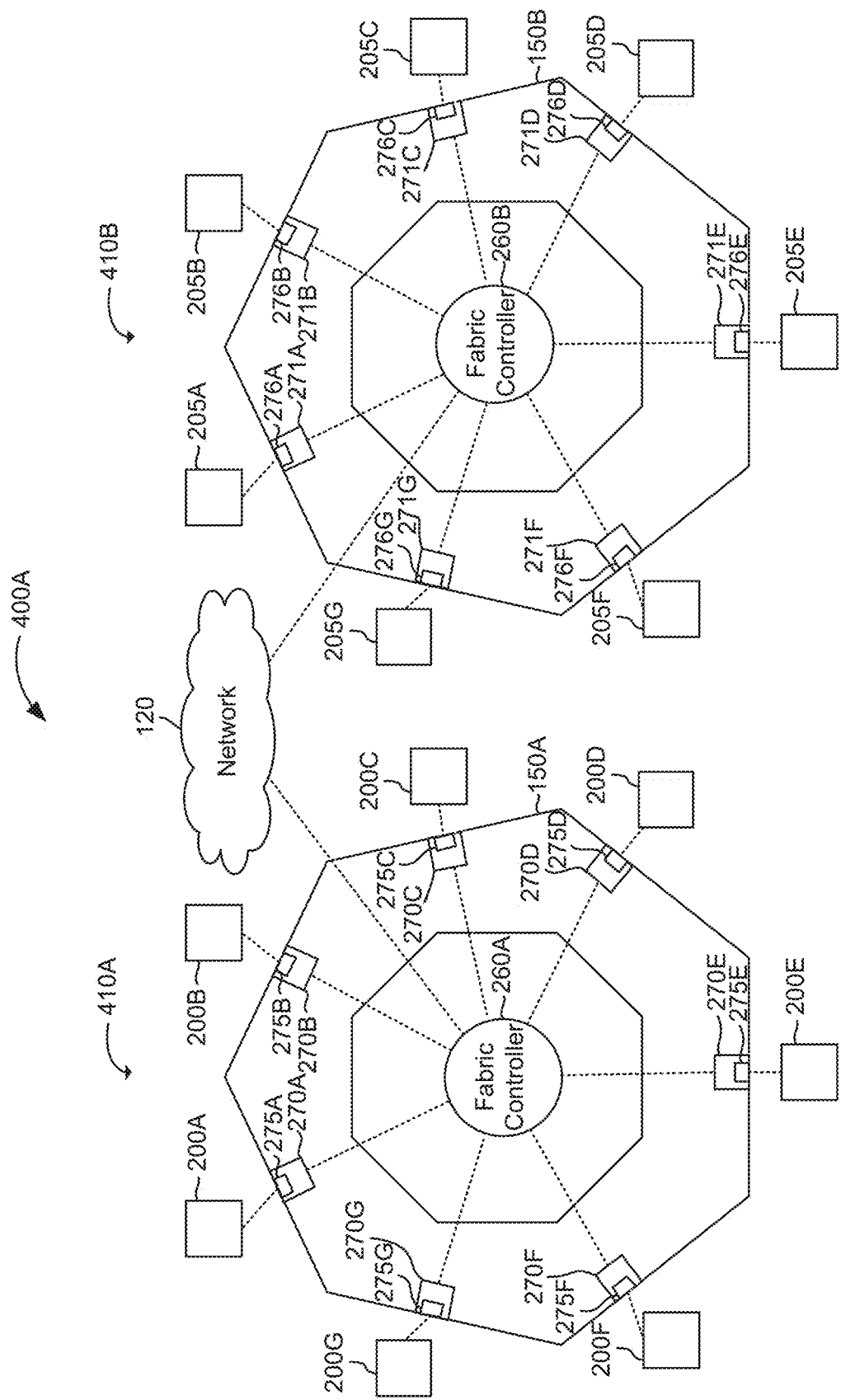
FIG. 4A illustrates a system comprising multiple network fabrics according to an example embodiment.

Referring now to FIG. 4A, which illustrates an example embodiment of system 400A, comprising network systems 410A and 410B, and communication network 120. Network systems 410A and 410B each comprise a network fabric 150A and 150B, a fabric controller 260A and 260B, a plurality of application servers 200A-200G and 205A-205G, respectively.

Network fabrics 150A and 150B comprise a plurality of fabric cards 270A-270G and 271A-271G, respectively. Network fabric 150A interconnects a plurality of application servers 200A-200G, a fabric controller 260A that resides within the network fabric 150A, and a plurality of fabric cards, 270A-270G. Fabric cards 270A-270G, each comprise a plurality buffers 650 on printed circuit boards and a corresponding port controller 275A-275G. Each port controller 275A-275G is coupled between at least one application server 200A-200G and fabric controller 260A.

Network fabric 150B interconnects a plurality of application servers 205A-205G, a fabric controller 260B that resides within the network fabric 150B, and a plurality of fabric cards 271A-271G. Fabric cards 271A-271G each comprise a plurality buffers on printed circuit boards and a corresponding port controller 276A-276G. Each port controller 276A-276G is coupled between at least one application server 205A-205G and fabric controller 260B.

In some embodiments, each port controller 275A-275G and 276A-276G may be coupled to more than one application servers. For example, a port controller may be coupled to two application servers where one of the application servers is a virtual application server.

Fabric controllers 260A and 260B are each coupled between a plurality of port controllers 275A-275G and 276A-276G, respectively, via the corresponding network fabrics 150A and 150B. Fabric controllers 260A and 260B are coupled to each other via communication network 120. Although only two network fabrics are shown in FIG. 4A, system 400A may comprise a plurality of network fabrics where respective fabric controllers are coupled together via communication network 120.

Figure 4B:
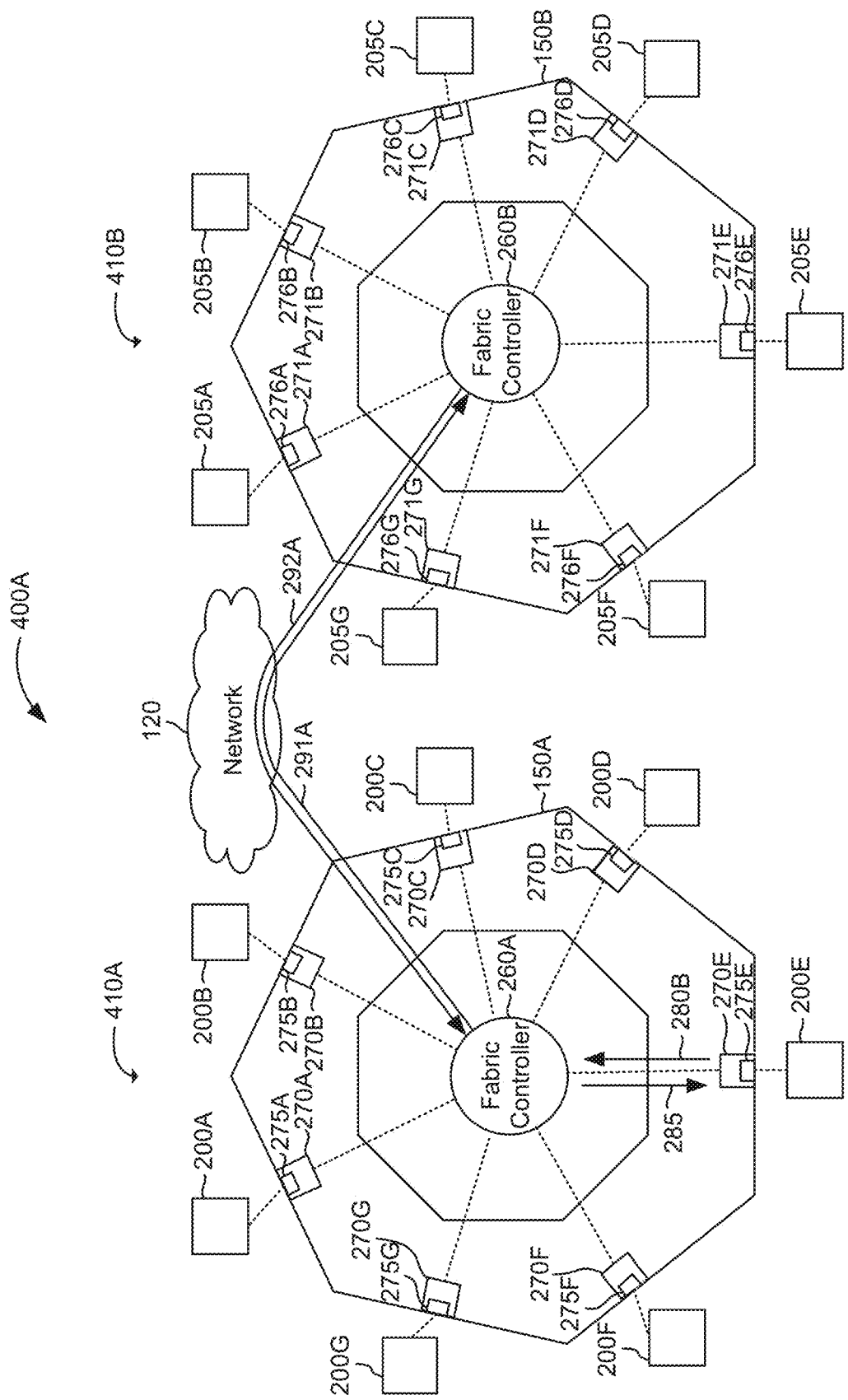
FIG. 4B illustrates a data flow for system of FIG. 4A according to an example embodiment.

Reference is now made to FIG. 4B, which illustrates an example data flow of system 400A. System 400A enables data flow between network fabrics 150A and 150B. However, fabric controllers 260A and 260B may not have destination location information for application servers or ports outside of their respective network fabrics 150A and 150B. In such situations, the interconnections between fabric controller 260A and fabric controller 260B via network 120 allows the fabric controllers to exchange destination location information between network fabrics resulting in appropriate routing of packets between source and destination, as discussed below.

In an example embodiment, source application server 200E coupled to network fabric 150A may intend to transmit packetized data to destination application server 205A coupled to network fabric 150B; however, source server 200E may not know the destination location of server 205A.

In such scenarios, source application server 200E transmits packetized data 280A to network fabric 150A. Source port 275E receives the packetized data 280A and configures fabric card buffers 650 on the corresponding fabric card 270E to store packetized data 280A. Source port 275E determines an application server attribute 280B from the packetized data 280A, and transmits the application server attribute 280B to fabric controller 260A. Fabric controller 260A checks its respective mapping information 550 to correlate the application server attribute 280B with a destination location. However, fabric controller 260A may be unable to determine the destination location from the application server attribute 280B and its respective mapping information 550 since the destination location is outside network fabric 150A.

Fabric controller 260A then transmits a request 291A to fabric controller 260B, via communication network 120. Request 291A includes application server attribute 280B. Request 291A may also include additional information, such as identification of the network fabric to which the source is coupled. In cases where a plurality of fabric controllers is connected to fabric controller 260A via network 120, the request 291A may be transmitted to all such fabric controllers.

Upon receiving request 291A, fabric controller 260B, and any other fabric controllers receiving the request, checks respective mapping information 550 to generate a destination location based on the application server attribute 280B. The fabric controller successfully generating the destination information send a response 292A back to the originating fabric controller 260A. As illustrated in FIG. 4B, fabric controller 260B, upon successfully generating destination identifier, transmits this information in a response 292A back to fabric controller 260A. Upon receiving response 292A, fabric controller 260A updates mapping information 550. Fabric controller 260A forwards the destination identifier 285 to the source port 275E. Source port 275E may record the destination identifier 285 in database 630, and configure buffers 650 on fabric card 270E to transmit packets 290 to the destination port based on the destination identifier 285.

Figure 4C:
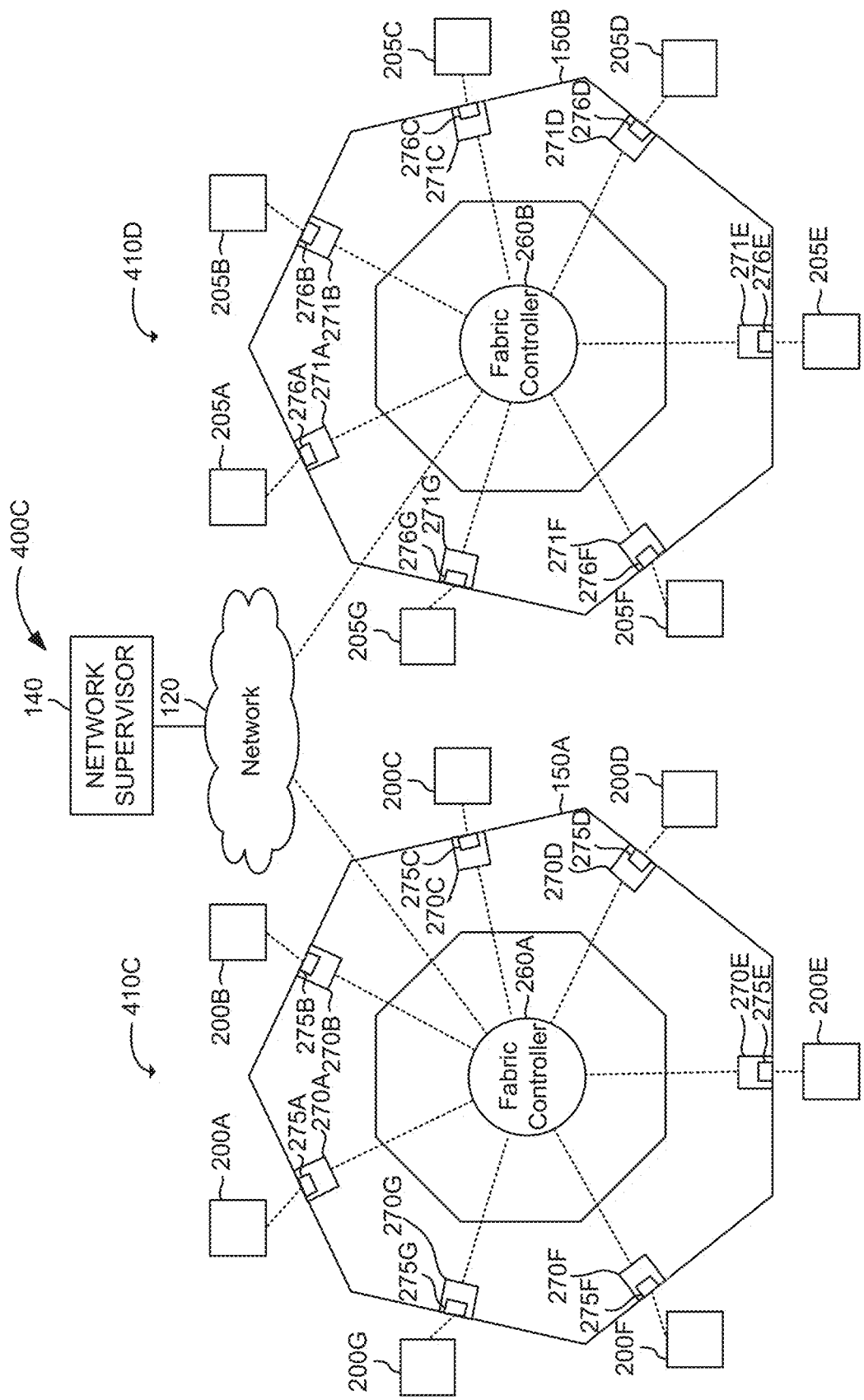
FIG. 4C illustrates a system comprising multiple network fabrics according to another example embodiment.

Reference is now made to FIG. 4C, which illustrates an example embodiment of system 400C, comprising network systems 410C and 410D, communication network 120, and a network supervisor 140. In system 400C, fabric controllers 260A and 260B are coupled to each other and to network supervisor 140 via communication network 120.

Figure 4D:
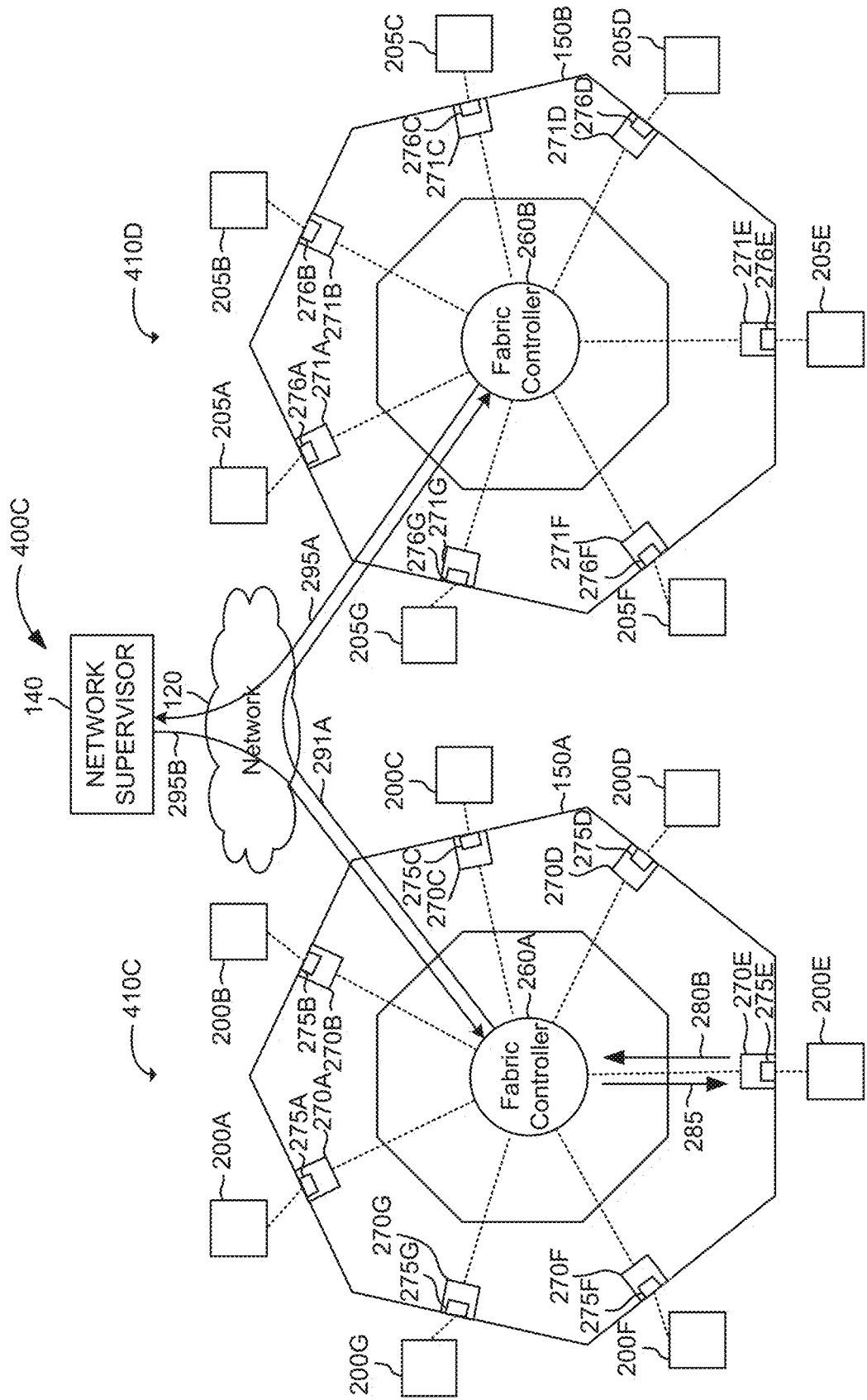
FIG. 4D illustrates a data flow for system of FIG. 4C according to an example embodiment.

Referring now to FIG. 4D, which illustrates an example data flow of system 400C of FIG. 4C. Data flow of system 400C is similar to data flow of system 400A, except in data flow of system 400C, none of the fabric controllers connected to fabric controller 260A, upon receiving the request 291A from fabric controller 260A, are able to generate destination identifier. In such scenarios, network supervisor 140 provides the destination information to fabric controller 260A and other fabric controller where the destination is actually located. This data flow is described below.

In one example, source application server 200E transmits packetized data 280A, intended for a destination server located outside network system 410C. Source port 275E receives packetized data 280A and configures fabric card buffers 650 on the corresponding fabric card 270E to store packetized data 280A. Source 275E port determines an application server attribute 280B from the packetized data 280A, and transmits the application server attribute 280B to fabric controller 260A. Fabric controller 260A checks its respective mapping information 550 to correlate a destination port with the application server attribute 280B. If fabric controller 260A is unable to determine a destination port from the application server attribute 280B and its respective mapping information 550, it transmits a request 291A to fabric controller 260B, via communication network 120. In some cases, the request 291A is transmitted to all fabric controllers connected to fabric controller 260A. Request 291A may comprise application server attribute 280B and identify the corresponding network fabric 150A sending the request 291A.

If fabric controller 260B is unable to determine a destination port based on the application server attribute 280B and its respective mapping information 550, fabric controller 260B transmits a request 295A to network supervisor 140 via communication network 120. In some other cases, fabric controller 260B sends a response directly to originating fabric controller 260A indicating that destination identifier could not be generated. In response, originating fabric controller 260A sends a request 295A directly to network supervisor 140.

Request 295A may comprise application server attribute 280B and identify the corresponding network fabric 150A where the source server/port is located. Network supervisor 140 determines the destination location and transmits a response 295B to fabric controller 260A. Upon receiving the response 295B, fabric controller 260A updates its respective mapping information 550 and forwards the destination identifier 285 to source port 275E. Source port 275E configures buffers 650 on fabric card 270E to transmit packets 290 to the destination location.

Figure 7:
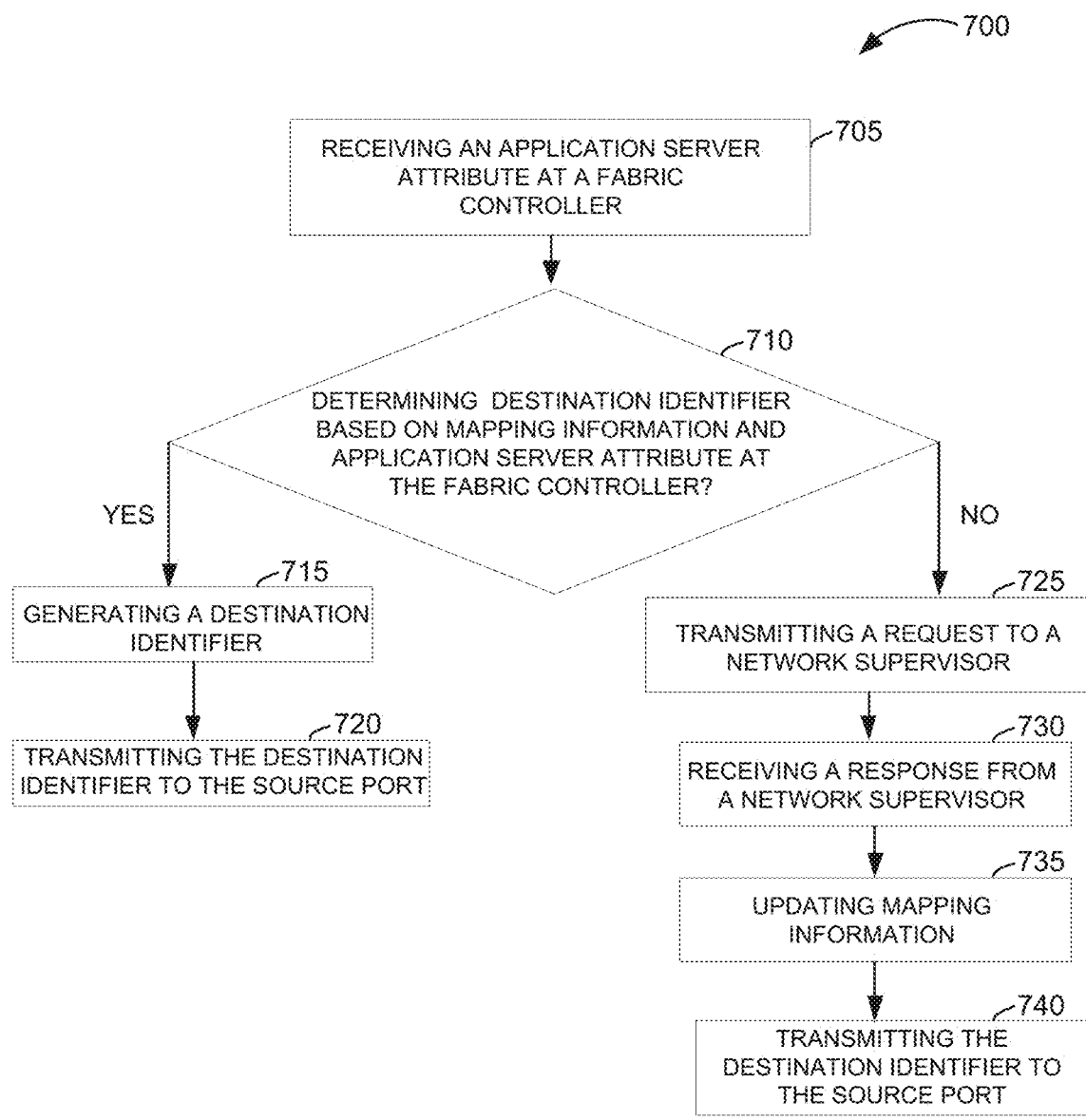
FIG. 7 illustrates a process flow according to an example embodiment.

Referring now to FIG. 7, which illustrates an example process 700 of a network system. At 705, the fabric controller receives an application server attribute 280B. At 710, the fabric controller 260 determines a destination port based on the application server attribute 280B and mapping information 550 stored on the fabric controller. If fabric controller 260 is able to determine a destination port based on the application server attribute 280B and mapping information 550, it generates a destination identifier 285 at 715. At 720, fabric controller 260 transmits the destination identifier 285 to the source port.

If the fabric controller 260 is unable determine a destination identifier 285 based on the application server attribute 280B and mapping information 550, it transmits a request 295A to a network supervisor 140 at 725. At 730, the fabric controller receives a response 295B from the network supervisor 140, which provides a destination location. At 735, the fabric controller 260 updates mapping information 550 based on the response 295B. At 740, fabric controller 260 transmits the destination identifier 285 to the source port.

Figure 8:
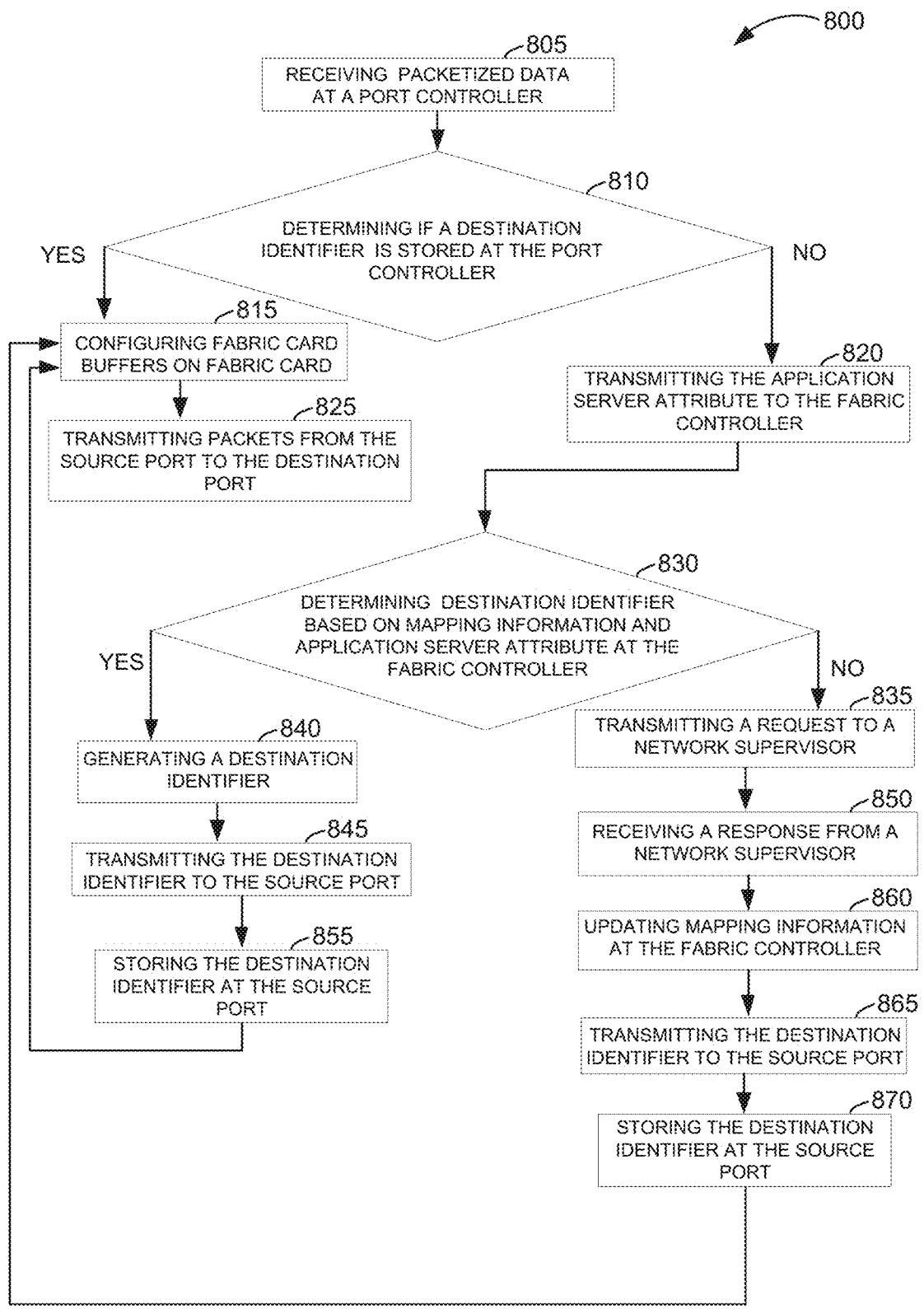
FIG. 8 illustrates another process flow according to another example embodiment.

Referring now to FIG. 8, which illustrates an example process 800 for a network system. At 805, a port controller 275 receives packetized data 280A from an application server 200. At 810, the port controller 275 determines an application server attribute 280B based on the packetized data 280A. Port controller 275 checks records on database 630 to determine if a destination identifier 285 is recorded corresponding to the application server attribute 280B. If a destination identifier 285 corresponding to the application server attribute 280B is recorded in database 630, port controller 275 configures fabric card buffers 650 on a corresponding fabric card 270 at 815. At 825, the source port 275 transmits packets 290 to the destination port.

If the port controller 275 does not have a destination identifier 285 corresponding to application server attribute 280B recorded in database 630, it transmits the application server attribute 280B to fabric controller 260 at 820. At 830, the fabric controller 260 determines a destination port based on the application server attribute 280B and mapping information 550. If the fabric controller 260 is able to determine a destination location based on the application server attribute 280B and mapping information 550, it generates a destination identifier 285 at 840. At 845, the fabric controller 260 transmits the destination identifier 285 to the source port. At 855, the source port may record the destination identifier 285 in database 630. The source port receives the destination identifier 285 and configures fabric card buffers 650 on the corresponding fabric card 270 at 815. At 825, the source port transmits packets 290 to the destination port.

If fabric controller 260 is unable to determine a destination port based on the application server attribute 280B and mapping information 550 at 830, it transmits a request 295A to a network supervisor 140 to obtain a destination port at 835. Fabric controller 260 then receives a response 295B from network supervisor 140 identifying the destination location at 850. Upon receiving the response 295B from the network supervisor 140, fabric controller 260 updates mapping information 550 based on the response 295B at 860. At 865, fabric controller 260 transmits a destination identifier 285 to the source port 275. At 870, upon receiving the destination identifier 285, the source port 275 may record the destination identifier in database 630. The source port then configures fabric card buffers 650 on a corresponding fabric card 270 at 815. At 825, the source port transmits packet 290 to the destination location based on the destination identifier 285.

The present invention has been described here by way of example only. Various modification and variations may be made to these example embodiments without departing from the spirit and scope of the invention, which is limited only by the appended claims

I claim:

1. A method for determining a destination location for transmission of packetized data between at least two network fabrics, the method comprising:
receiving an application server attribute at a first fabric controller associated with a first network fabric from a source port, the application server attribute comprising metadata corresponding to a type of content contained in the packetized data;
attempting to generate, by a processor, at the first fabric controller the destination location based on the application server attribute and mapping information stored in a memory inside the first fabric controller;
if the destination location is not generated by the first fabric controller based on the application server attribute and mapping information stored on the first fabric controller:
transmitting a first request comprising a network fabric identifier from the first fabric controller to a second fabric controller associated with a second network fabric, the network fabric identifier being configured to identify the first network fabric associated with the first fabric controller;
if the destination location is generated by the second fabric controller based on the first request:
receiving a first response at the first fabric controller from the second fabric controller, the first response comprising the destination location;
updating the mapping information at the first fabric controller based on the first response; and
transmitting the destination location to the source port, wherein the source port transmits the packetized data to a destination based on the destination location.

2. The method of claim 1, wherein if the destination location is not generated by the second fabric controller based on the first request, the method further comprises:
receiving a second response at the first fabric controller from a network supervisor system, wherein the second response is based on a second request transmitted from the second fabric controller to the network supervisor system, wherein the second request comprises the network fiber identifier and the second response indicates the destination location; and
updating the mapping information at the first fabric controller based on the second response.

3. The method of claim 2, wherein the source port stores the destination location received from the network supervisor system.

4. The method of claim 1, wherein the source port stores the destination location received from the second fabric controller.

5. The method of claim 1, wherein if the destination location is not generated by the second fabric controller based on the first request, the method further comprises:
receiving a second response at the first fabric controller from the second fabric controller, wherein the second response indicates that that the second fabric controller could not generate the destination location;
transmitting a second request comprising the network fabric identifier from the first fabric controller to a network supervisor system;
receiving a second response at the first fabric controller from the network supervisor system, wherein the second response comprises the destination location; and
updating the mapping information at the first fabric controller based on the second response.

6. The method of claim 1, wherein the application server attribute comprises at least one of a local identification number assigned to an application server by the first fabric controller and a source identifier.

7. The method of claim 1, wherein the mapping information stored on the first fabric controller contains at least one port record, wherein each port record comprises two fields that correlate a particular application server attribute and a particular destination location.

8. The method of claim 1, wherein the source port determines the application server attribute based on the packetized data received from a source application server coupled to the source port for transmission to the destination location.

9. The method of claim 1, wherein the source port is located on a source fabric card comprising a plurality of buffers, and wherein the source port transmits the packetized data to the destination by configuring the plurality of buffers based on the destination location.

10. The method of claim 1, wherein the destination is a destination application server, and wherein the destination location is an IP address of the destination application server.

11. The method of claim 1, wherein the type of content contained in the packetized data includes at least one of audio, video and data content.

12. A system for determining a destination location for transmission of packetized data between at least two network fabrics, the system comprising:
at least one port controller coupled to at least one application server, the at least one port controller generating at least one application server attribute for the packetized data received from the corresponding application server, wherein the application server attribute comprises metadata corresponding to a type of content contained in the packetized data;
a first fabric controller uniquely coupled to a first network fabric and a second fabric controller uniquely coupled to a second network fabric, each of the first and second fabric controllers comprising:
a database for storing mapping information; and
a processor coupled to the database,
wherein the processor for the first fabric controller is configured to:
receive the at least one application server attribute from the port controller;
attempt to generate the destination location based on the at least one application server attribute and the mapping information; and
if the destination location is not generated based on the application server attribute and the mapping information, transmit a first request comprising a network fabric identifier to determine the destination location to the second fabric controller, the network fabric identifier identifying the first network fabric associated with the first fabric controller; and
if the destination location is generated by the second fabric controller based on the first request, receive a first response comprising the destination location from the second fabric controller, and update the mapping information to record the destination location based on the response.

13. The system of claim 12, wherein the application server attribute comprises at least one of a local identification number assigned to an application server by the fabric controller and a source identifier.

14. The system of claim 13, wherein the port controller is located on a fabric card comprising a plurality of buffers for transmitting the packetized content to a destination, and wherein the port controller is configured to configure the plurality of buffers based on the destination location.

15. The system of claim 12, further comprising:
a network supervisor system,
wherein if the destination location is not generated by the second fabric controller based on the first request, the processor for the first fabric controller is further configured to:
receive a second response from the network supervisor system, wherein the second response is based on a second request transmitted from the second fabric controller to the network supervisor system, wherein the second request comprises the network fiber identifier and the second response indicates the destination location; and
update the mapping information to record the destination location based on the second response.

16. The system of claim 12, further comprising:
a network supervisor system,
wherein if the destination location is not generated by the second fabric controller based on the first request, the processor for the first fabric controller is further configured to:
receive a second response from the second fabric controller indicating that the second fabric controller could not generate the destination location;
transmit a second request comprising the network fabric identifier to a network supervisor system;
receive a second response comprising the destination location from the network supervisor system; and
update the mapping information to record the destination location based on the second response.

17. The system of claim 12, wherein the first fabric controller is further configured to transmit the destination location to the port controller, and wherein the port controller is further configured to store the destination location and to transmit the packetized data to a destination based on the destination location received from the fabric controller.

18. A first fabric controller for determining a destination location for transmission of packetized data between at least two network fabrics, the first fabric controller being associated with a first network fabric of the at least two network fabrics, the first fabric controller comprising:
a memory for storing mapping information; and
a processor coupled to the memory, the processor being configured to:
receive an application server attribute from a source port;
attempt to generate a destination location based on the application server attribute and the mapping information;
if the destination location is not generated based on the application server attribute and the mapping information, transmit a first request comprising a network fabric identifier to determine the destination location to a second fabric controller associated with a second network fabric, the network fabric identifier for identifying the first network fabric associated with the first fabric controller;
and
if the destination location is generated by the second fabric controller based on the first request, receive a first response comprising the destination location from the second fabric controller, update the mapping information to record the destination location, and transmit the destination location to the source port, wherein the application server attribute comprises metadata corresponding to a type of content contained in the packetized data.

19. The first fabric controller of claim 18, wherein if the destination location is not generated by the second fabric controller based on the first request, the processor is configured to:
receive a second response from a network supervisor system, wherein the second response is based on a second request transmitted from the second fabric controller to the network supervisor system, wherein the second request comprises the network fiber identifier and the second response indicates the destination location;
update the mapping information to record the destination location; and
transmit the destination location to the source port.

20. The first fabric controller of claim 18, wherein if the destination location is not generated by the second fabric controller based on the first request, the processor is configured to:
receive a second response from the second fabric controller, wherein the second response indicates that the second fabric controller could not generate the destination location;
transmit a second request comprising the network fabric identifier to a network supervisor system;
receive a second response comprising the destination location from the network supervisor system;
update the mapping information to record the destination location; and
transmit the destination location to the source port.

* * * * *